United States Patent
Kristiansen et al.

(10) Patent No.: US 7,293,079 B1
(45) Date of Patent: Nov. 6, 2007

(54) METHOD AND APPARATUS FOR MONITORING A NETWORK USING STATISTICAL INFORMATION STORED IN A MEMORY ENTRY

(75) Inventors: Adrian M. Kristiansen, Somerville, MA (US); Richard P. Modelski, Hollis, NH (US)

(73) Assignee: Nortel Networks Limited (CA)

( * ) Notice: Subject to any disclaimer, the term of this patent is extended or adjusted under 35 U.S.C. 154(b) by 778 days.

(21) Appl. No.: 09/741,853

(22) Filed: Dec. 22, 2000

(51) Int. Cl.
*G06F 15/173* (2006.01)
(52) U.S. Cl. .................................. 709/223; 709/224
(58) Field of Classification Search ................ 709/223, 709/200, 228, 230, 224, 233, 235; 370/389–392, 370/353; 707/100, 3
See application file for complete search history.

(56) References Cited

U.S. PATENT DOCUMENTS

| | | | | |
|---|---|---|---|---|
| 4,817,080 A | * | 3/1989 | Soha | 370/252 |
| 5,231,593 A | * | 7/1993 | Notess | 702/180 |
| 5,684,945 A | * | 11/1997 | Chen et al. | 714/20 |
| 5,884,255 A | * | 3/1999 | Cox | 704/233 |
| 5,886,643 A | * | 3/1999 | Diebboll et al. | 709/224 |
| 6,076,115 A | * | 6/2000 | Sambamurthy et al. | 709/250 |
| 6,157,955 A | * | 12/2000 | Narad et al. | 709/228 |
| 6,330,603 B1 | * | 12/2001 | Seki et al. | 709/226 |
| 6,438,141 B1 | * | 8/2002 | Hanko et al. | 370/477 |
| 6,529,901 B1 | * | 3/2003 | Chaudhuri et al. | 707/3 |
| 6,598,080 B1 | * | 7/2003 | Nagami et al. | 709/227 |
| 6,643,260 B1 | * | 11/2003 | Kloth et al. | 370/235 |
| 6,687,247 B1 | * | 2/2004 | Wilford et al. | 370/392 |
| 6,771,646 B1 | * | 8/2004 | Sarkissian et al. | 370/392 |

* cited by examiner

*Primary Examiner*—Nathan Flynn
*Assistant Examiner*—Mohammad Siddiqi
(74) *Attorney, Agent, or Firm*—McGuinness & Manaras LLP

(57) ABSTRACT

A method monitors a network. The method receives at least one data packet, and reads an entry of a memory device. The entry of the memory device containing a first statistical value and a second statistical value. The method determines a third statistical value based on at least one of the data packet, the first statistical value, and the second statistical value. The method then stores the determined third statistical value in the entry of the memory device.

33 Claims, 16 Drawing Sheets

METHOD AND APPARATUS FOR MONITORING A NETWORK USING STATISTICAL INFORMATION STORED IN A MEMORY ENTRY

BACKGROUND

1. Field of the Invention

This invention generally relates to the field of data packet processing. More particularly, the present invention relates to monitoring a network using statistical information stored in an entry of memory.

2. Description of Background Information

The unprecedented growth of data networks (e.g., corporate-wide Intranets, the Internet, etc.) as well as the development of network applications (e.g., multimedia, interactive applications, proprietary corporate applications, etc.) have resulted in creating a demand for higher network bandwidth capabilities and better network performance. Moreover, such demands are exacerbated by the advent of policy-based networking, which requires more data packet processing, thereby increasing the amount of work per packet and occupying processing resources. One approach to increase network bandwidth and improving network performance is to provide for higher forwarding and/or routing performance within the network.

Some improvements in routing performance are directed to enhancing processor throughput. Processor designers have been able to obtain throughput improvements by greater integration, by reducing the size of the circuits, and by the use of single-chip reduced instruction set computing (RISC) processors, which are characterized by a small simplified set of frequently used instructions for rapid execution. It is commonly understood, however, that physical size reductions cannot continue indefinitely and there are limits to continually increasing processor clock speeds.

Further enhancements in processor throughput include modifications to the processor hardware to increase the average number of operations executed per clock cycle. Such modifications, may include, for example instruction pipelining, the use of cache memories, and multi-thread processing. Pipeline instruction execution allows subsequent instructions to begin executing before previously issued instructions have finished. Cache memories store frequently used and other data nearer the processor and allow instruction execution to continue, in most cases, without waiting the full access time of a main memory. Multi-thread processing divides a processing task into independently executable sequences of instructions called threads and the processor, recognizing when an instruction has caused it to be idle (i.e., first thread), switches from the instruction causing the memory latency to another instruction (i.e., second thread) independent from the former instruction. At some point, the threads that had caused the processor to be idle will be ready and the processor will return to those threads. By switching from one thread to the next, the processor can minimize the amount of time that it is idle.

In addition to enhancing processor throughput, improvements in routing performance may be achieved by partitioning the routing process into two processing classes: fast path processing and slow path processing. Partitioning the routing process into these two classes allows for network routing decisions to be based on the characteristics of each process. Routing protocols, such as, Open Shortest Path First (OSPF) and Border Gateway Protocol (BGP), have different requirements than the fast-forwarding Internet Protocol (FFIP). For example, routing protocols, such as OSPF and BGP, typically operate in the background and do not operate on individual data packets, while FFIP requires IP destination address resolution, checksum verification and modification, etc. on an individual packet basis.

The IP fast forwarding problem is becoming harder as the amount of time allotted for processing on a per packet basis steadily decreases in response to increasing media transmission speeds. In an effort to alleviate this problem, many router and Layer-3 switch mechanisms distribute the fast path processing to every port in their chassis, so that fast path processing power grows at a single port rate and not at the aggregate rate of all ports in the box. This provides only temporary relief as network wire speeds have increased exponentially recently (e.g., Ethernet's 10, 100, to 1,000 MBps increase) while processing speeds have traditionally improved, on average, by a factor of two every 18 months. It is clear that most of current solutions will run out of steam, as the faster media become the mainstream.

SUMMARY OF INVENTION

In one implementation of the present invention, a method is provided for monitoring a network. The method receives at least one data packet, and reads an entry of a memory device. The entry of the memory device containing a first statistical value and a second statistical value. The method determines a third statistical value based on at least one of the data packet, the first statistical value, and the second statistical value. The method then stores the determined third statistical value in the entry of the memory device.

DETAILED DESCRIPTION

Figure 1:
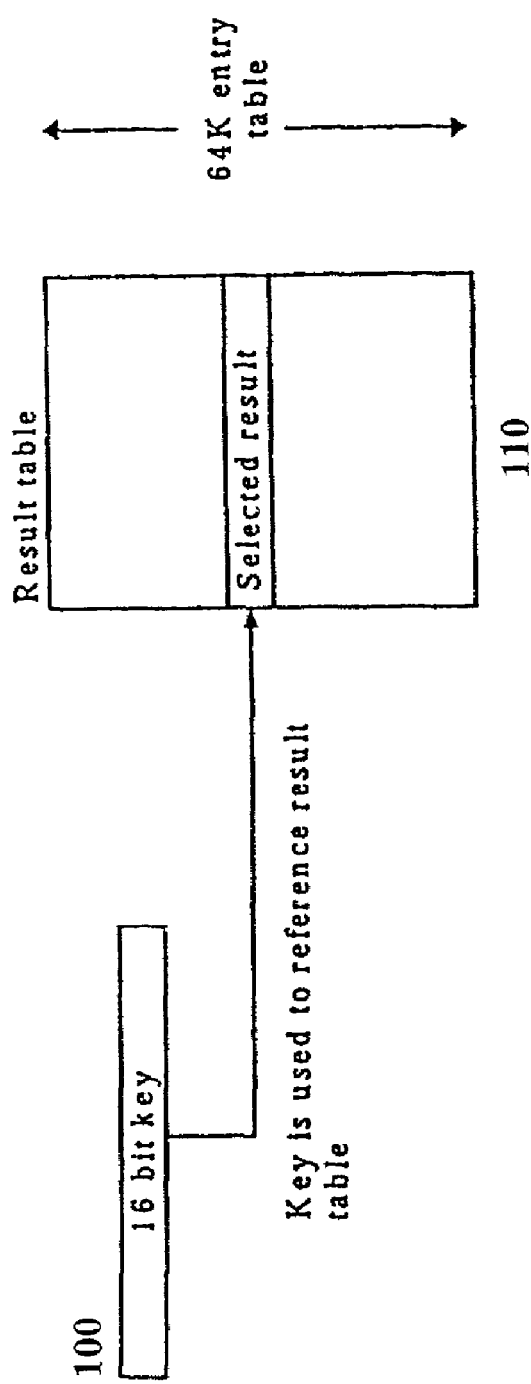
FIG. 1 depicts a radix lookup.

The following detailed description, divided into subparts such as radix lookups, filter operations on data packets, key hashing, and network monitoring, refers to the accompanying drawings that illustrate embodiments of the present invention, which may process at least one of Synchronous Optical NETwork (SONET), Asynchronous Transfer Mode (ATM), Ethernet, High-level Data Link Control (HDLC), Point-to-Point Protocol (PPP), Internet Protocol (IP), Transmission Control Protocol (TCP), and User Datagram Protocol (UDP) data packet. In the drawings, like reference numerals (e.g., a key 100, a result table 110, a valid bit table 120, and a transition bit table 130) represent similar parts of the present invention throughout the several views. Other embodiments are possible and modifications may be made to the embodiments without departing from the spirit and scope of the invention. Therefore, the following detailed description is not meant to limit the invention. Rather the scope of the invention is defined by the appended claims, and their equivalents.

A table or a file is a group of data elements, each of which may be called an entry or a record in the table. Generally, a key is associated with each record. The key is used to differentiate among different records. The key associated with a particular record may or may not need to be unique, depending on the search method utilized in accessing the table. In addition, the key may or may not be embedded within the record itself.

A search method accepts a key value as input and attempts to locate a record within a table stored in memory of a computer system whose associated key is the key value. The search method may return a record, or a pointer to the record. If the search of a table is unsuccessful in finding the key, then there is no record in the table associated with the key value. If the search is unsuccessful, an insertion may be performed to add a new record with the key value as its key.

A table is stored in a data structure in the memory or an external storage, e.g., magnetic disk, of a computer system. The form of the data structure may be an array of records, a tree, a linked list, etc. Certain search methods are generally more applicable to one form and location of a data structure than another. Thus, the data structure in which a table is stored is, in part, selected according to the search method to be used to access information within the table.

One search method utilizes a tree to facilitate searching a table stored in the memory of a computer system. This search method forms a tree based on symbols of which the keys are comprised. This is generally referred to as a radix search tree.

Radix Lookups

Lookup data structures aid in speed of access to memory and/or of storage of lookup structures into memory. In one embodiment of a radix lookup, accesses to memory are chained (e.g., see FIGS. 8-12). A portion of the memory being allocated to one chaining level of the lookup. Lookups using a radix-4 method may be used to route IP packets. A first stage may use a radix-4 nibble of a key to perform a lookup, which may locate a result, a miss or an address for a next stage. The address being an index into a next portion of the memory that is allocated to a next chaining level. Subsequent stages repeat the process until the result is obtained or the key is exhausted. A 24-bit lookup key then results in seven memory accesses (i.e., 1+(24/4)) to a data structure in the memory. The lookup key may be of a variable size. This process of radix lookup allows IP routing tables to require less memory, and allows for the reduction of overhead for the maintenance of IP tables and of costs associated with memory.

A list of enhanced lookups for enhancing lookup performance includes: radix-4; compressed radix-8; compressed radix-12; and compressed radix-16. Radix-16 lookups may be more efficient because a 16 bit key may be resolved using only two memory access. The drawback being that a unique valid bit or transition bit should be stored for each 16 bit combination of the key. A data structure of the compressed radix-16 shares a pointer to a next result with 16 valid or transition bits. The next result (i.e., address) comprises a sum of the number of valid or transition bits in the data structure before a valid or transition entry of interest and the pointer contained in the data structure. In another example, a 24-bit key may be resolved in 4 cycles by using a compressed radix-16 followed by two radix-4 lookups.

Valid Bits

One embodiment illustrates radix and compressed radix searches using valid and transition bits. Radix lookups may use a key or portions of a key as an address into a table, as depicted in FIG. 1. For example, if a 16-bit key 100 is being looked up, a 64 k-entry table 110 of results may be referenced by the 16-bit key 100. The value in the table 110 is the result of the lookup. If the expected result is large, the result table 110 can become large. If the table 110 is sparsely populated, this lookup process is inefficient. Sparse tables often occur for lookup structures based on network addresses. It is, thus, desirable to shrink the size of the result entries.

In a valid bit table, the result indicates whether the entry is valid or not, which may be indicated using a single bit. In this example, the result table 110 has 64 k entries and each entry is one bit. As discussed above, the bit is referenced with the key 100 and the result indicates if the key 100 is valid or not.

Figure 2:
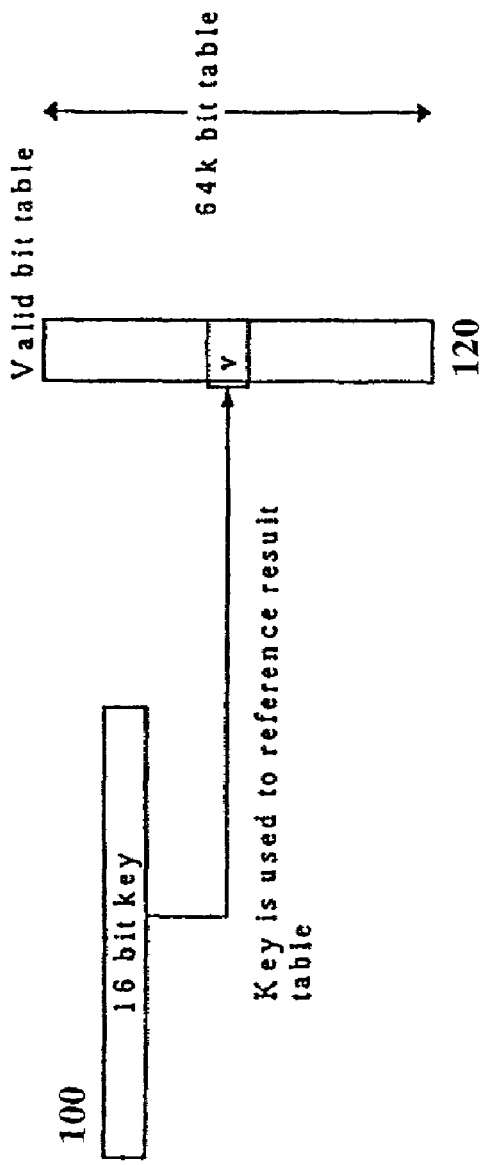
FIG. 2 depicts a radix lookup with a valid bit table.
Figure 3:
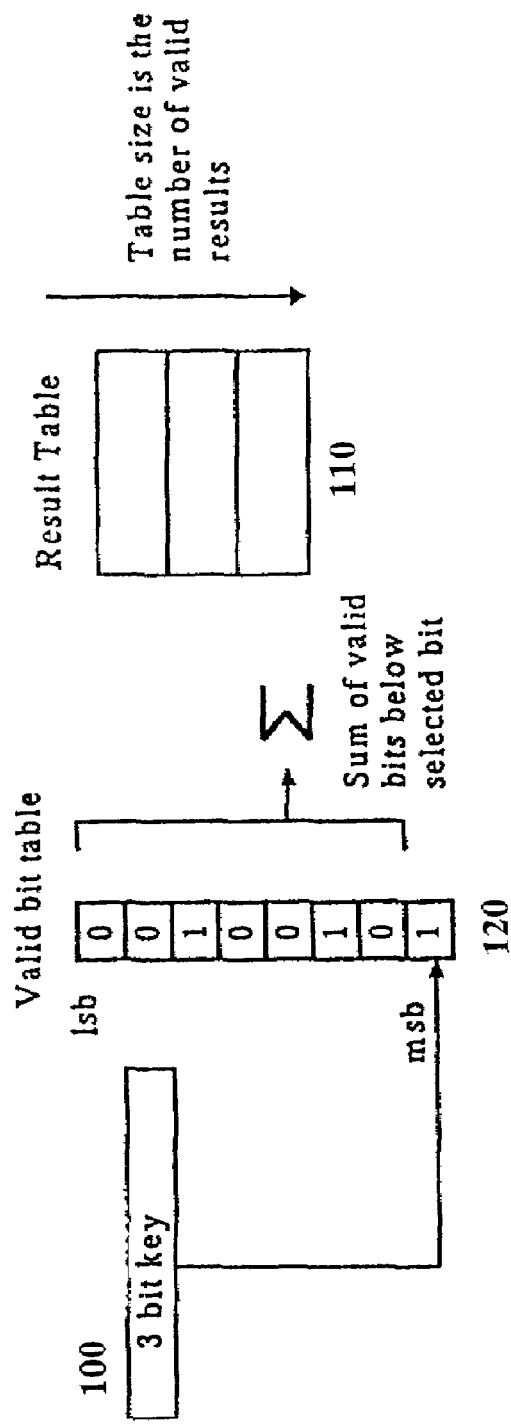
FIG. 3 depicts a valid bit table with a compressed result table.

The valid bit table wastes a small quantity of space (e.g., a single bit) on invalid results. However, the valid bit table does not provide a large result for valid entries. To overcome this, an additional table may be referenced that contains the results for valid entries. This result table may contain as many entries as there are valid results. An entry that is at location N in the result table, for example, is associated with the valid bit that is the Nth valid bit in the bit table. Then, to determine the location of a result given a valid bit, the valid bits from N−1 to 0 may be summed. For example, in an 8-entry bit table with 3 valid results corresponding to a key of 2, 5 and 7, a key of 7 would result in the bit table being referenced at bit 7. Bit 7 being set indicates that the entry is valid and that the result is available. Because bit 7 is the third valid bit that is set, the result for bit 7 is the third entry in the result table at location 2 (counting addresses from 0). The value 2 is computed by summing all the valid bits below the valid bit selected. FIG. 2 depicts a radix lookup with valid bits 120. FIG. 3 depicts a valid bit table 120 with a compressed result table 110.

Figure 4:
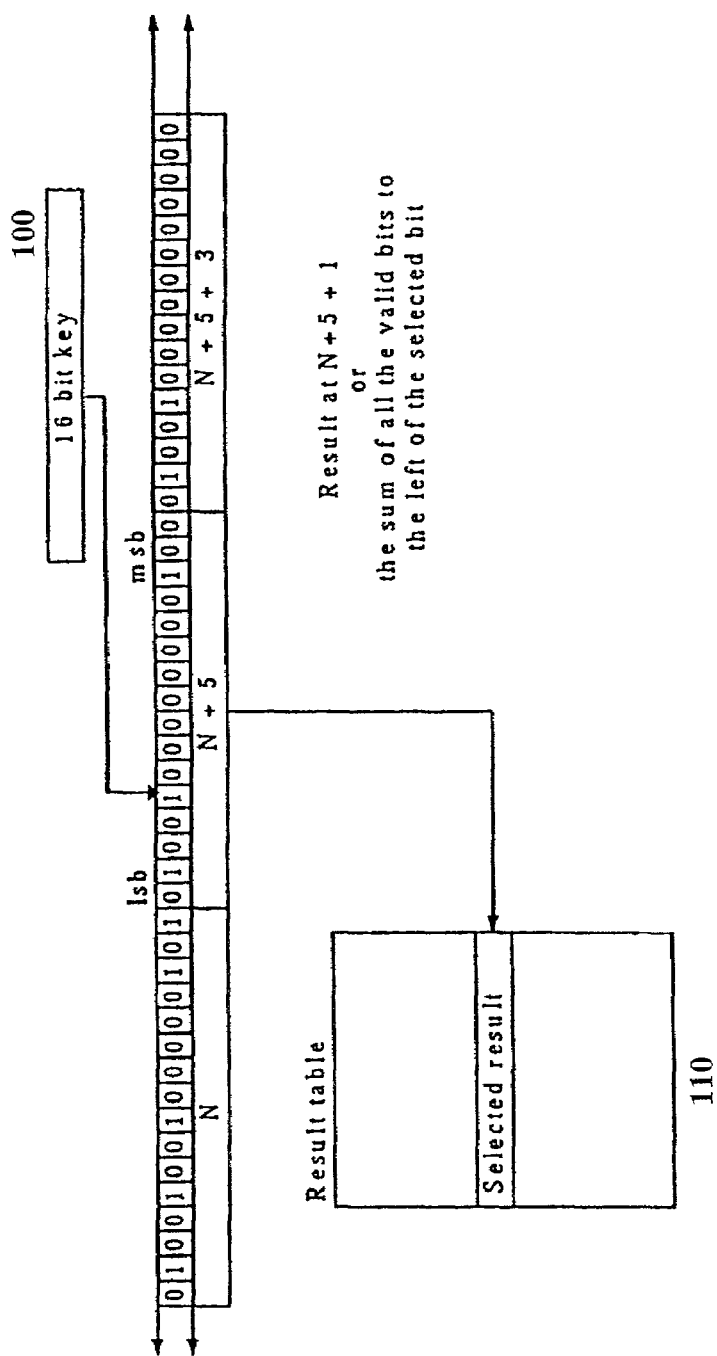
FIG. 4 depicts a valid bit table with a count.

The sum of all the valid bits below the bit selected may require a large number of accesses. Such accesses may be minimized by keeping a count along with the bit string at even intervals that records the number of valid entries to that point. The address of the result is then the sum of the count, plus the number of one's beyond the count but below the bit selected. An example of this is a 64 k-bit string with count values every 16 bits. The count value would need to be at most 16 bits long to cover the possible 64 k results as depicted in FIG. 4. The bit field is now depicted on its side for convenience.

In FIG. 4, N is the count value of the bit field above it. That is, N is the count or sum of all valid entries to the left of the segment. The result entry is then the count field plus the bits in the selected bit field segment that are to the left of the selected bit. FIG. 4 illustrates the sizes of 16 bits of valid and a 16-bit offset. The count may need to be large enough to account for the maximum number of results. The bit field associated with the count may be of any size.

This embodiment of a result arrangement provides efficient use of memory. For example, it is effective in tables with a large number of entries since there is a fixed overhead associated with the bit field and count representation. One drawback with this embodiment is the adding and/or removing entries from the table. That is, adding an entry to the beginning of the table may require all of the counts after the addition to be incremented (by one).

Figure 5:
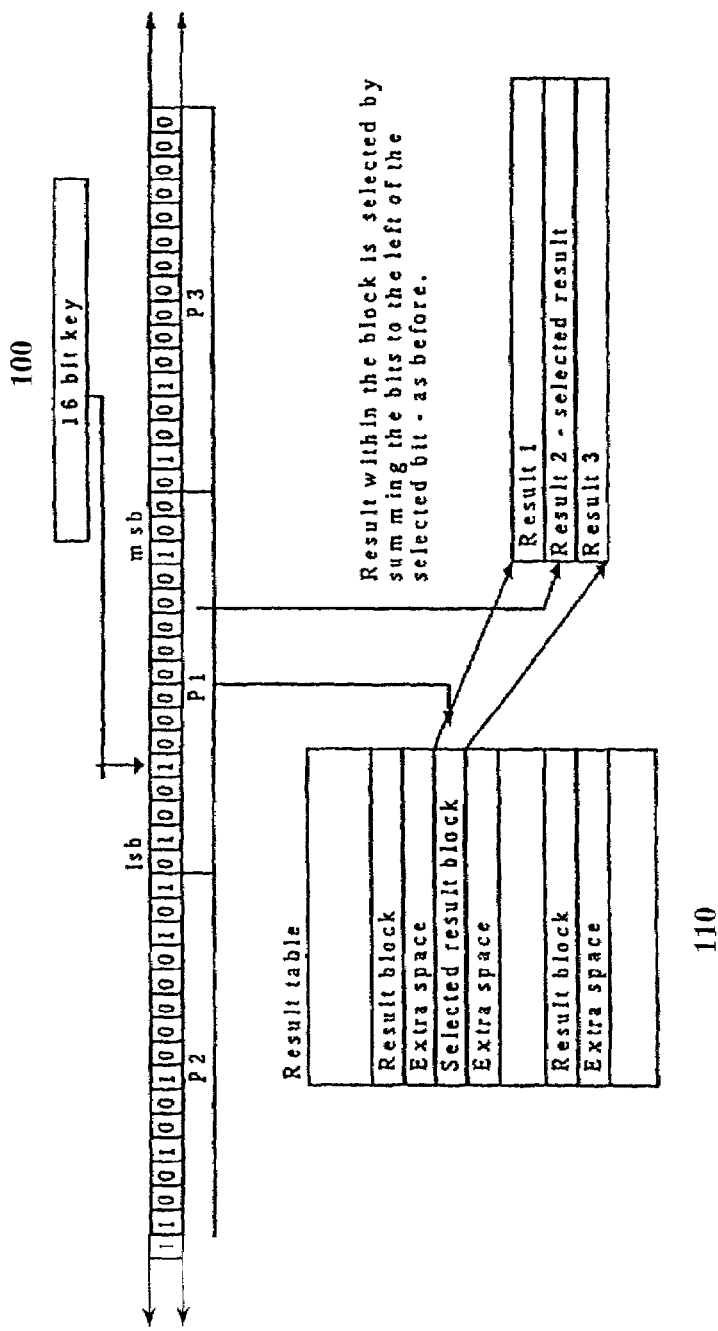
FIG. 5 depicts a valid bit table with pointers.

FIG. 5 illustrates one embodiment for improving this by replacing the count by a pointer. The pointer points to a block of memory allocated for that pointer/bit field. The block may be at least as large as the number of valid entries associated with that bit field. For example, if a pointer/bit field has a bit field of "010010010000100101," which contains 6 valid results, the pointer points to a block of 6 consecutive entries in the result table 110. To allow for adding and deleting entries, entries may be allocated between these blocks. The use of a pointer allows entries to be added between the blocks.

Transition Bits

The ability to represent ranges within a table is of value in networking. The valid bit embodiment described may not be optimal for representing ranges. For example, if a range of 0x4560 to 0x456f is represented with the valid bit embodiment, then 16 duplicate entries in the result table may be used, one for 0x4560, one for 0x4561 and so on.

Figure 6:
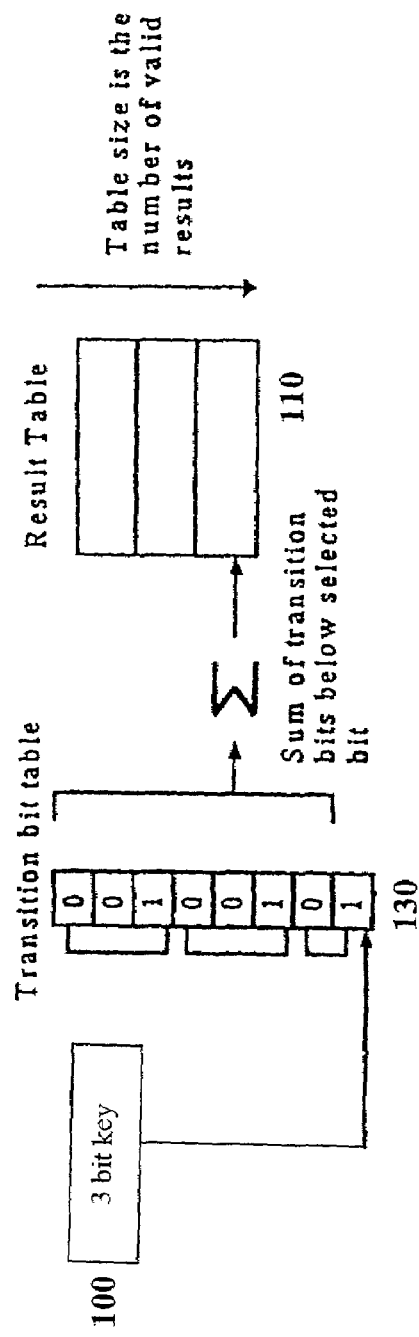
FIG. 6 depicts a transition bit table.

Accordingly, another embodiment uses transitions in the bit field rather than the valid entries, as depicted in FIG. 6. A one in the bit field indicates the end of a range rather than a single valid entry. The method of computing the address of the result corresponding to the range resembles the embodiment of the valid bit tables. A one in the bit field indicates the end of a range, and may also indicate a transition to a new result. An offset of a result may then be obtained by summing the number of 1's to the left (less significant bits) of the selected bit. In a transition bit table 130, there may be no "invalid" entry. Every range may have a result—even if the result indicates the range is invalid. FIG. 6 illustrates an example having three ranges represented, 0-2, 3-5, and 6-7. A key 100 of 7 then would result in the transition field being referenced at bit 7. Bits 0-6 may be summed to provide the offset of 2 (counting from 0) into the result table 110.

Figure 7:
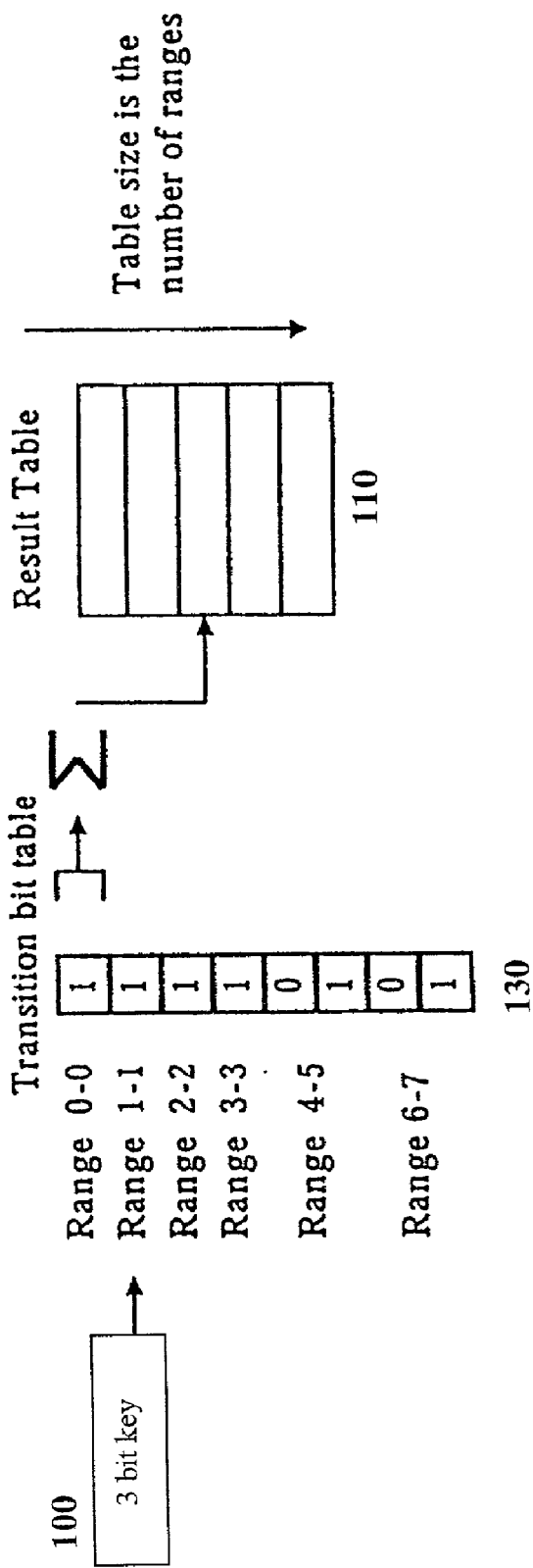
FIG. 7 depicts a transition bit table.

FIG. 7 depicts how a transition table 130 may be used to represent ranges of one value. As with the valid bit tables, as discussed above, the transition bit tables 130 may be used to represent larger tables. This may require an additional count field to avoid having to sum all bits below the bit selected. The table 130, however, may be difficult to update because all the count fields above a new or deleted entry may need to be adjusted when making changes. This, however, may be alleviated by using pointers rather than counts.

The use of pointers in a transition table 130 may not be as effective as in the valid table. This is because, unlike a valid bit table, the leading 0's in a transition bit table 130 have a result. The result is the same result as any trailing 0's in the previous field. Thus, the pointer in the second field may need to point to the trailing entry in the result table of the first field. This eliminates the ability to add empty space between entries, which may be overcome by adding additional redundant entries when separating two regions with shared results. Although this requires additional memory, the benefits of allowing easy insertion and deletion may be justified.

Radix 4 Lookup

A radix 4 lookup may search for a key up to 64-bits long. Search chaining may be performed up to 16 levels based on a read access for each nibble of the key. If more than 16 reads are issued to a search table, an exception may be generated. Also, if during the lookup sequence an address calculation causes the address to "roll over" from a large value to a small value, the lookup may be terminated that indicates the generation of a "bad" address. The following information may be provided when issuing a radix 4 lookup: a key (e.g., up to 64 bits); a key length (e.g., in nibble increments, 4 bits); and an address (e.g., an address of memory).

Radix 4 Lookup with Valid Bits

Figure 8:
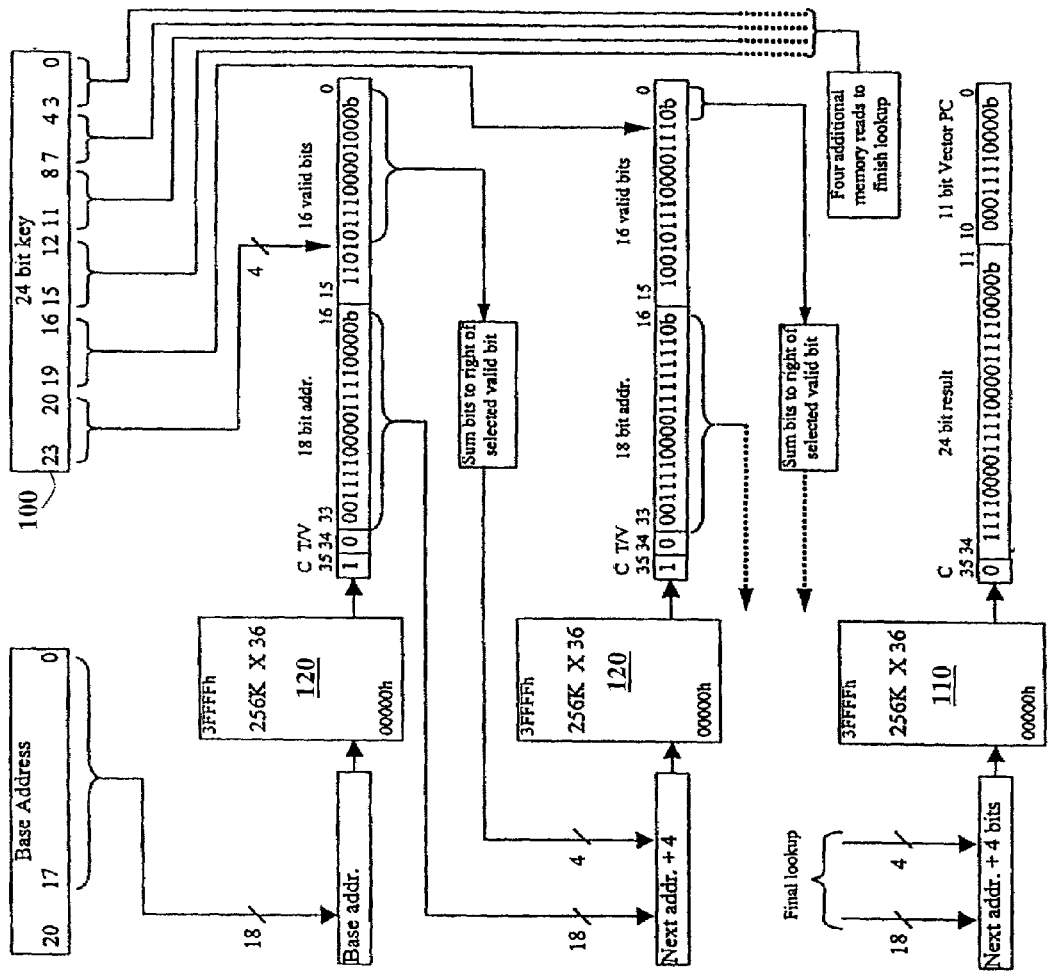
FIG. 8 depicts a radix 4 lookup with valid bits.

FIG. 8 illustrates an embodiment of a method for a radix 4 lookup. FIG. 8 illustrates a 24-bit key 100 and 256K×36 memory. The lookup table being defined with valid bits. In this illustrative embodiment, memory may be read seven times. The lookup begins with a base address, a key 100, and a key length containing a value of 6 in FIG. 8. The address may be used to index into memory to obtain a first entry. This entry may be partitioned as follows:

Bit 35—Continue bit. This bit may be set to 1 if the lookup should continue. It also may indicate whether the current lookup entry contains the next lookup address and/or 16 transition/valid bits. If the continue bit is still set after reaching the end of the key, an error may be indicated. If the continue bit is cleared, for example, the lookup may terminate. Then, the entry may contain a 24 bit result and/or 11 bit vector. The continue bit may be cleared at any point in the lookup method to terminate the search, which saves on memory bandwidth and storage space.

Bit 34—T/V bit. This bit may indicate whether transition or valid bits are used (if the continue bit is set to 1). In this illustrative embodiment, the T/V bit is set to 0 for valid bits and 1 for transition bits. If the continue bit is low, the T/V bit may be used as the most significant bit of the 24 bit result.

Bits 33 to 0—If the continue bit is set to 1, for example, bits 33-16 may represent the next 18 bit lookup address and bits 15-0 may represent the transition or valid bits. On the other hand, if the continue bit is cleared to 0, for example, bits 34-11 may represent the 24 bit result and bits 10-0 may represent the 11 bit vector.

This illustrative embodiment depicts valid bits to detect whether a key 100 is valid. After each memory read, a nibble of a key may be used to index into the valid bits and determine whether the valid bit is set, for example. If it is, the corresponding 18-bit address may be used as a base address for a next memory read. If the valid bit is cleared, the lookup may terminate and a miss may be indicated.

If the lookup continues, the 18-bit address may be "adjusted" based on the settings of the valid bits. One illustrative method adds the address with the nibble that selected the valid bit to get a pointer (e.g., 18-bit pointer) to the next memory location. In this embodiment, the 18-bit address comprises a pointer to a 16-entry table in memory, one for each corresponding valid bit. This, however, consumes memory because each valid bit that is cleared has a corresponding entry in the table that contains unnecessary data. To improve memory efficiency, the valid bits to the right of the selected valid bit are summed. This provides an offset to be added to the 18-bit address to create the final 18-bit pointer for the next memory read. In FIG. 8, the first lookup comprises 7 valid bits set. In other words, the corresponding 18-bit address may be a base address to a 7-entry table, which reduces the memory entries by 9 (i.e., 16 minus 7). Then, the next lookup accesses memory entry 0F0F4h. If a key 100 is added to the table to comprise 8 valid bits, an 8-entry table may be created at another memory entry. The 18-bit address may be modified to point to the base address of this new table. The addition/deletion of these tables is resolved with memory management.

The memory of the illustrative embodiment may be a different physical device for each access if the lookup table is spread across two or more memories. Spreading the table may minimize bandwidth bottlenecks for any single memory when the memory is targeted with many requests. Also, spreading the table across memories allows for the implementation of larger tables. Thus, each nibble of the key, for example, may be processed using a different memory.

Radix 4 Lookup with Transition Bits

Figure 9:
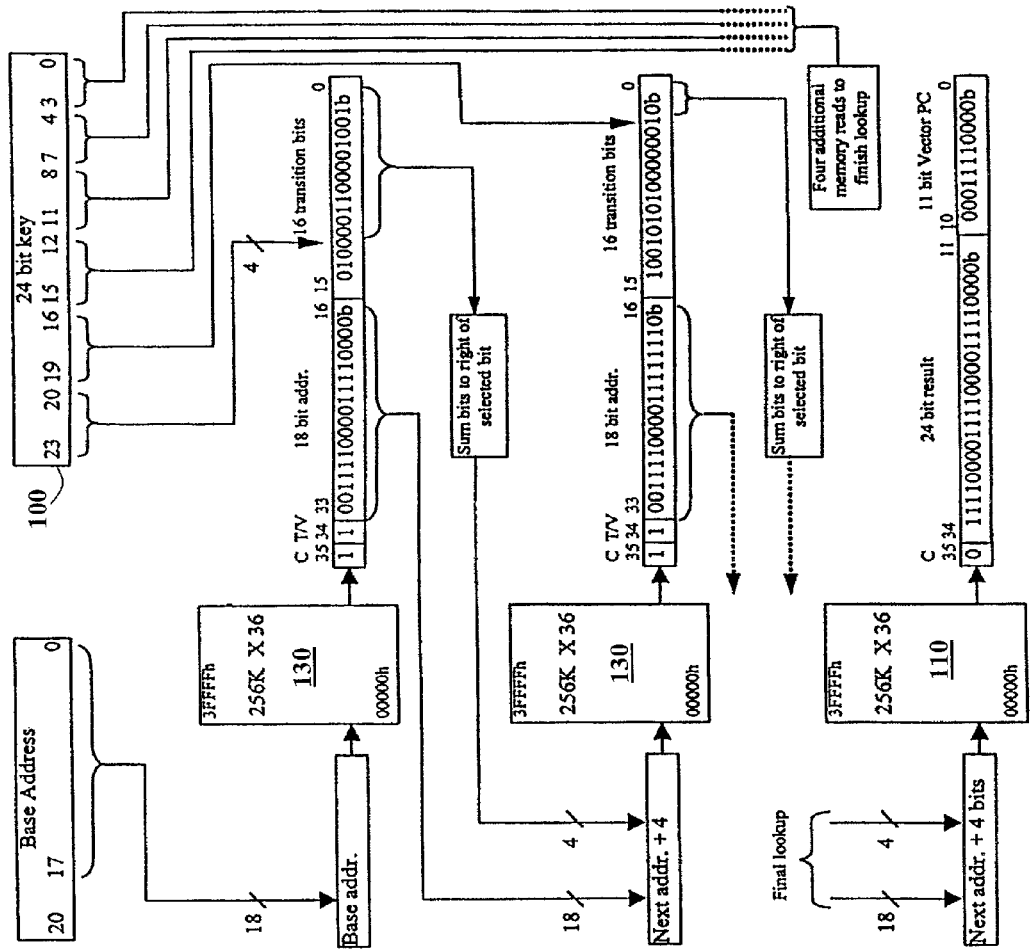
FIG. 9 depicts a radix 4 lookup with transition bits.

In certain cases, transition bits may use memory more efficiently than valid bits. If a nibble of a key is valid for all 16 combinations (i.e., all valid bits are set to 1), then a corresponding table in memory may have 16 entries. This table may be reduced to one entry with transition bits. Transition bits may occupy a 16-bit field, each '1' in the field representing an end of a range. For example, for 16 valid keys containing each 24 bits in length with values of FFFFF0h through FFFFFFh. If the lookup uses valid bits, the valid bit field may appear as "1111111111111111b." On the other hand, if the lookup uses transition bits, the transition bit field may appear as "0000000000000001b." A nibble of a key may index into this transition bit field, the 1's to the right of the selected transition bit may be added to generate an offset. This offset may be added to the 18-bit address to generate a final 18-bit pointer for a next memory read. FIG. 9 illustrates a method to implement lookups using transition bits.

One further example comprises a key valid from FFFFF0h through FFFFF7h and invalid from FFFFF8h through FFFFFFh. A valid bit field may appear as "1111111100000000b" while a transition bit field may appear as "0000000100000000b." A nibble of a key may index into this field from bit locations 15 to 8 for the valid keys and 7 to 0 for the invalid keys. The offset may be a 0 or 1 and added to a 18-bit address to point to a 2-entry table. A next memory access may bring back a final result for that range when the continue bit is low, for example. If the continue bit is high, bits 33 to 0 may represent another 18-bit address and a 16-bit transition field to evaluate a next nibble of the key.

In another example, if a range is assigned for each value of a nibble in a key, then all bits in a transition field may be high. If keys FF0FFFh, FF1FFFh, FF2FFFh, . . . , and FFFFFFh are valid and a third nibble (from the left) is used to index into the transition field, a range may be assigned for each value because the method may still verify the remaining three nibbles of the key. A calculated offset may range from 0 to 15 as an index into a 16-entry table, one for each key. In this example, transition bits may not be of more benefit than valid bits. FIGS. 8 and 9 illustrate that the method may handle both valid and transition bits. The bit type may be defined for each nibble to minimize lookup table size by utilizing the advantages of both schemes.

Radix 8 Lookup

Figure 10:
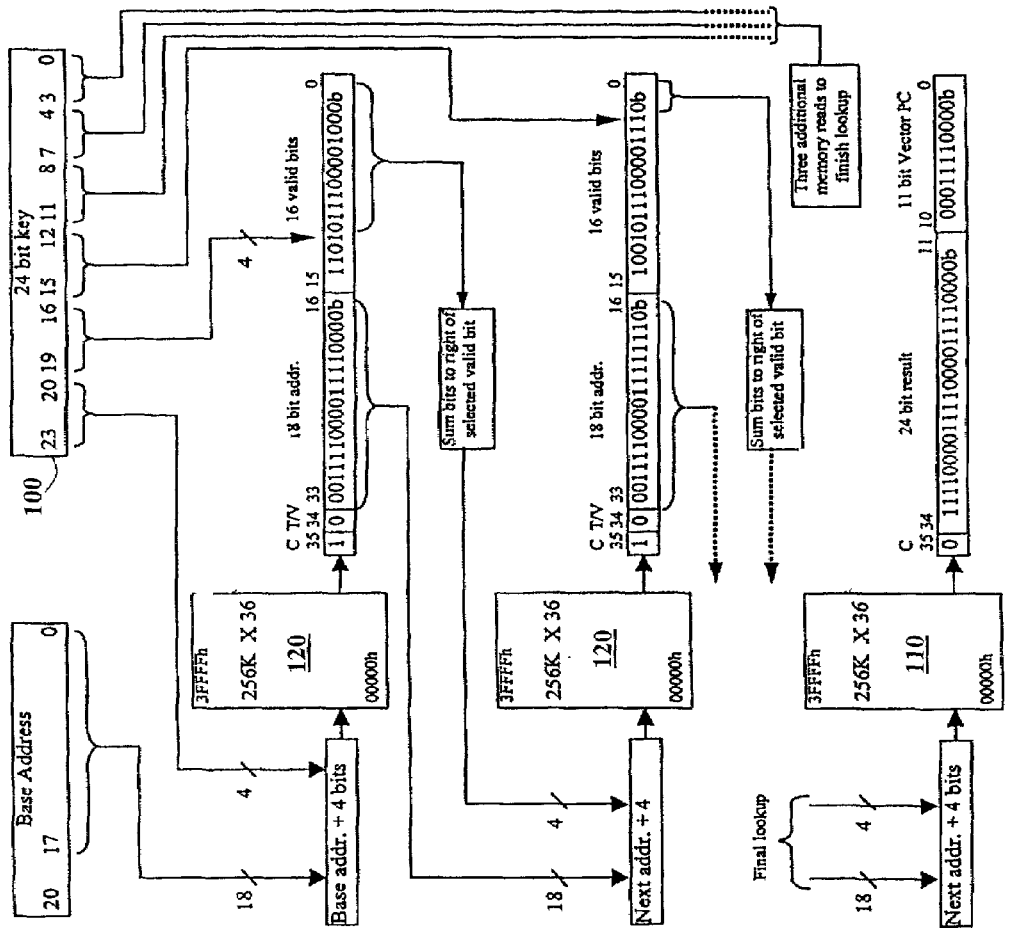
FIG. 10 depicts a radix 8 lookup with valid bits.

FIG. 10 illustrates a radix 8 lookup using valid bits, for example. A radix 8 lookup may begin a search using a first four bits of a key 100 to index into memory. Subsequent searches on the key 100 may occur in nibble increments. The radix 8 lookup may save a memory cycle over the radix 4 lookup (but may use more memory). The radix 8 lookup comprises at least one of valid and transition bits.

Radix 12 Lookup

Figure 11:
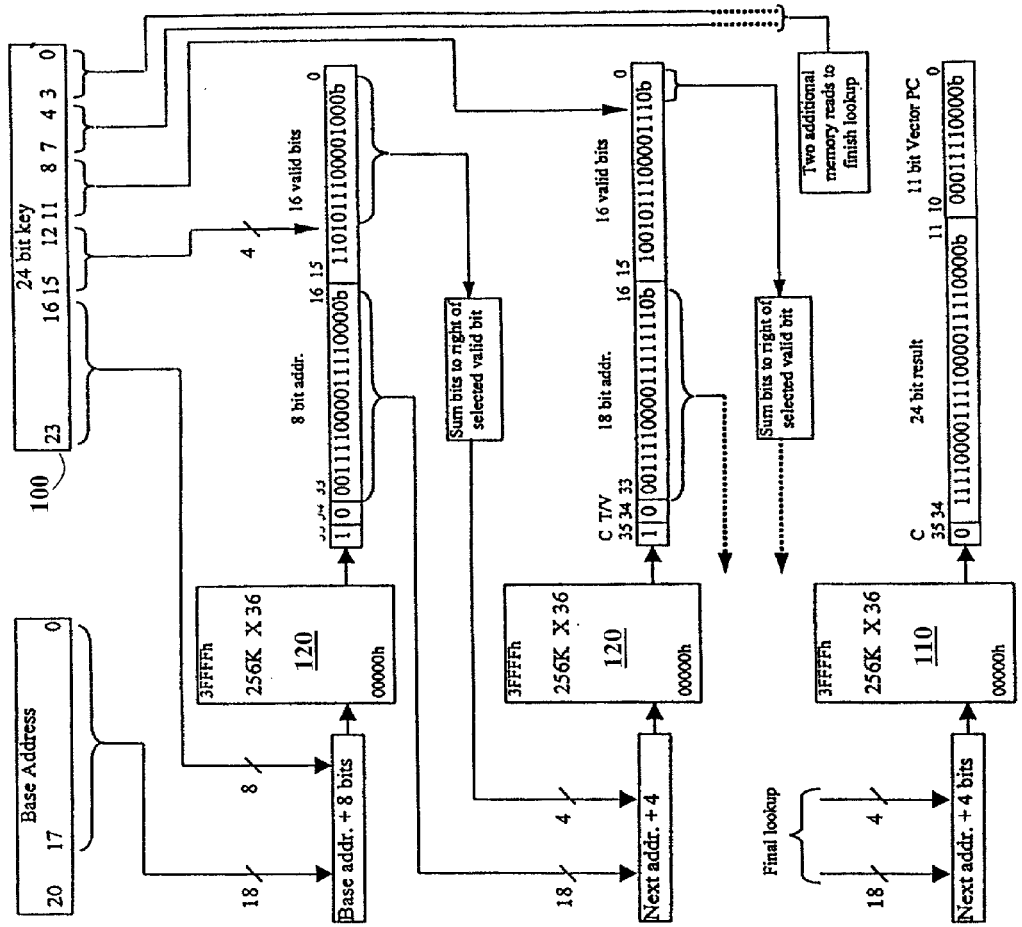
FIG. 11 depicts a radix 12 lookup with valid bits.

FIG. 11 illustrates a radix 12 lookup using valid bits, for example. In the illustrated embodiment, the method accesses memory five times for a 24 bit key 100. The radix 12 lookup may begin a search using a first 8 bits of the key 100 to index into memory. Subsequent searches on the key 100 may occur in nibble increments. The radix 12 lookup may save two (i.e., 7 minus 5) memory cycles over the radix 4 lookup (but may use more memory—when a first lookup table is sparsely populated). The radix 12 lookup comprises at least one of valid and transition bits.

Radix 16 Lookup

Figure 12:
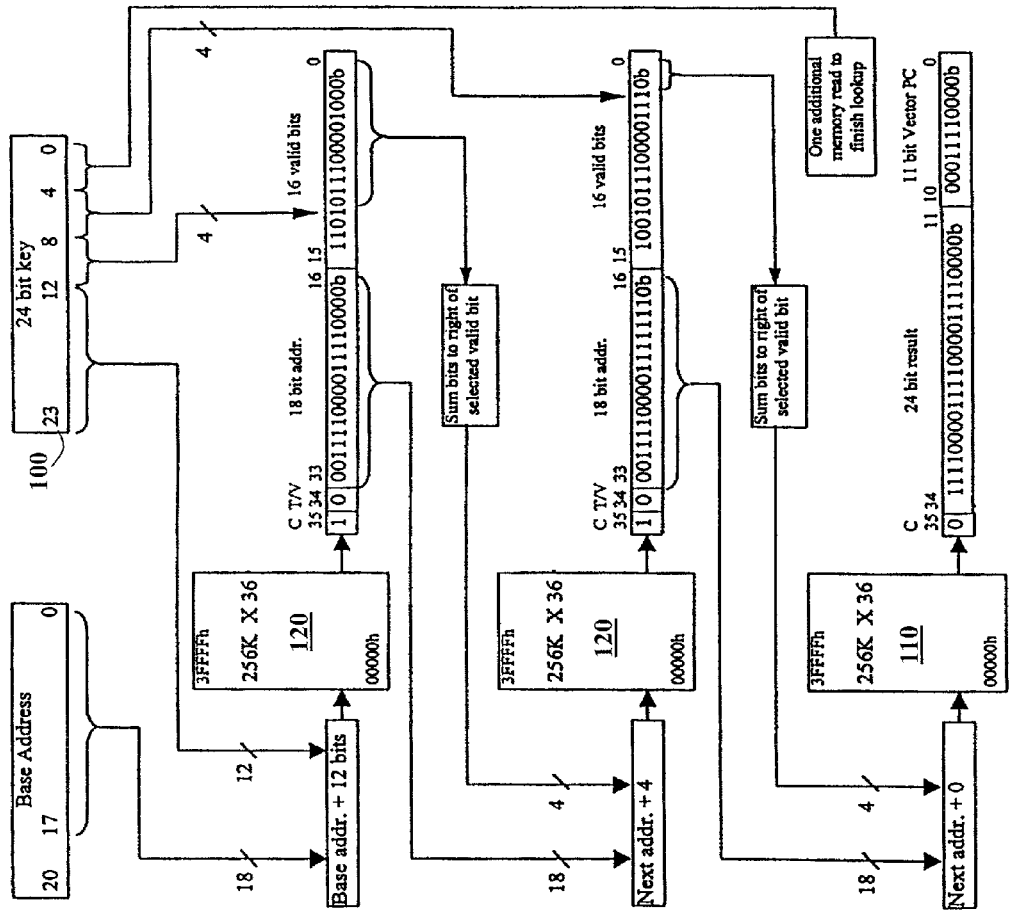
FIG. 12 depicts a radix 16 lookup with valid bits.

FIG. 12 illustrates a radix 16 lookup using valid bits. In the illustrated embodiment, the method accesses memory four times for a 24 bit key 100. The radix 16 lookup may begin a search using a first 12 bits of the key 100 to index into memory. Subsequent searches on the key 100 may occur in nibble increments. The radix 16 lookup may save three (i.e., 7 minus 4) memory cycles over the radix 4 lookup, but may use more memory when a first lookup table is sparsely populated. The radix 16 lookup comprises at least one of valid and transition bits.

Filter Operation on Data Packets

Filter rules allow for the classification and processing (e.g., drop, forward, and/or modify) of data packets. The filter rules may comprise at least one field of a data packet, such as a source address or a destination address. In one embodiment, a plurality of filter rules for a particular field of a data packet may be applied simultaneously (or near the same time) with an instruction call (e.g., a filter instruction).

Filter instructions, like lookup instructions described above, may begin with a radix search (e.g., FIGS. 8-12). However, instead of returning a 24-bit result and a vector, it may return a filter value. The bit definitions in a filter table may be the same as a lookup table. For example, when a continue bit is low (i.e., cleared), bits 31-0 represent a 32 bit filter value. Filter instructions may then access search memory with capabilities including: variable key size; radix 4; compressed radix-8; compressed radix-12; and compressed radix-16.

Figure 13:
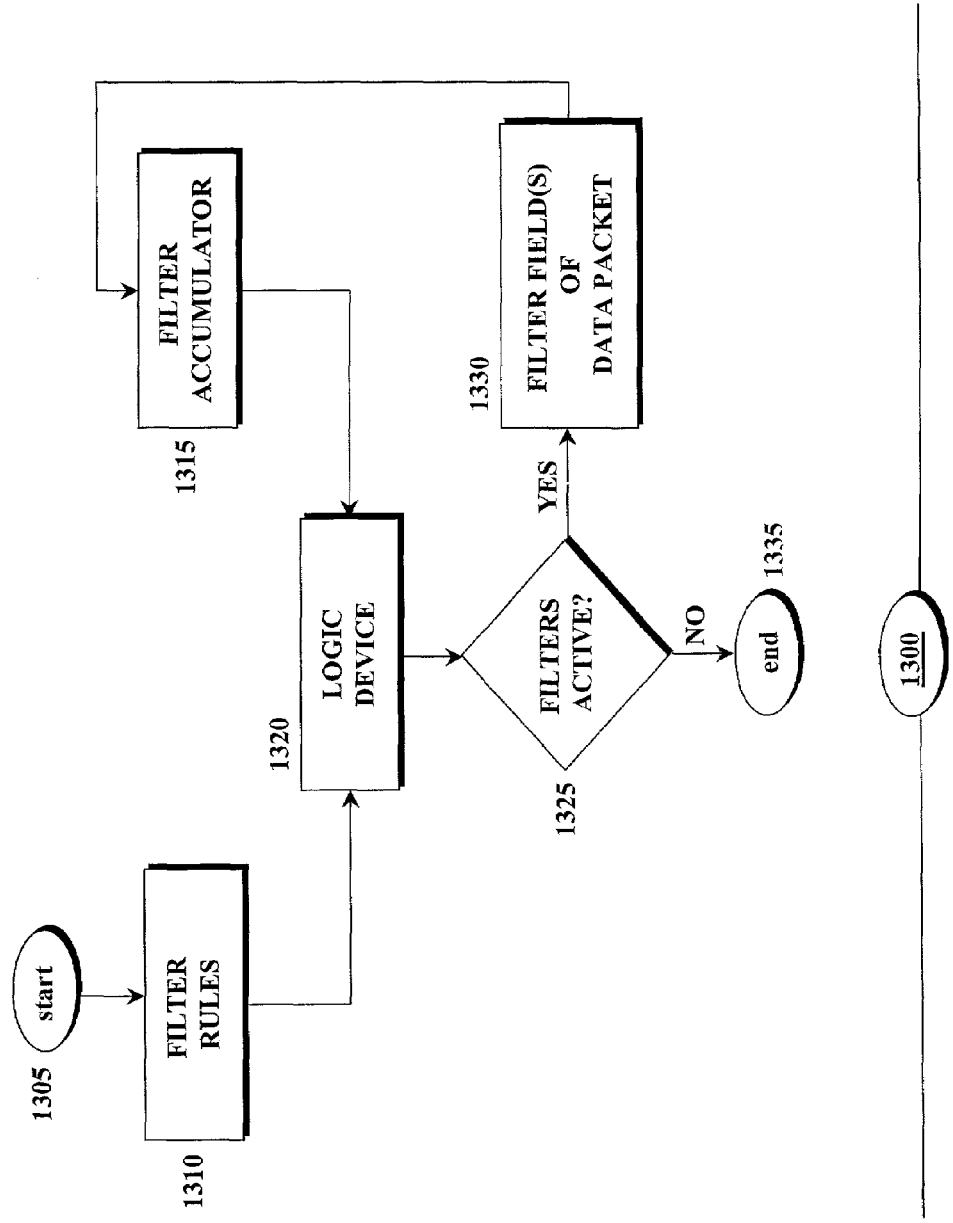
FIG. 13 depicts a flowchart illustrating one embodiment for performing a plurality of filter operations on a data packet using an instruction.

FIG. 13 illustrates one method 1300 for performing a plurality of filter operations on a data packet using an instruction. The method 1300 starts at block 1305. The method 1300 then performs a radix search based on a filter instruction that returns a result or a bit-mask 1310 (e.g., a 32-bit mask), wherein the bits of the mask correspond to filter rules. The result may be logically "ANDed" 1320 with contents 1315 of a filter accumulator register, which accumulates information related to filter operations, to perform the filter instruction. The logic device 1320, which may comprise an "AND" gate, allows the filter accumulator register to indicate whether a filter rule remains active, which may be indicated by a set bit. The bits of the filter accumulator register correspond to the bits of the mask. An active filter rule comprises a rule and associated actions that remain "valid" after application of a filter instruction on a particular field. An inactive filter rule comprises a rule and associated actions that are "invalid" after application of a filter instruction on a particular field. Then, in block 1325, a decision is made whether to perform a filter rule. Any active bit (i.e., a set bit) in the filter accumulator register indicates that a filter rule remains active and to be performed, as illustrated in block 1330. On the other hand, if the filter accumulator register contains no active bits (i.e., no filter rules remain active), the filter operation may end, as illustrated in block 1335. This is because no filter rule remains active, and additional filter instructions would yield the same result.

The method 1300 allows one field of a data packet to be processed in parallel with all filter rules in the set. The number of fields to filter on may be the number of filter instruction calls issued for a given set of filters. Use of conditional branching on each filter rule allows the skipping of filter instructions, as described above, based on the data stored in the filter accumulator register. This allows for filter operations to be performed in an efficient manner. Application of a read instruction on the filter accumulator register then allows for the determination of filter results (e.g., filter hit). The data bits of the filter accumulator register that correspond to filter rules may be prioritized to assist the read instruction to determine the filter results. For example, the most significant data bit of the filter accumulator register, which may have the highest priority, may be read before the least significant data bit of the filter accumulator register, which may have the lowest priority.

In one illustrative example, the embodiment supports 64 filters simultaneously with the same filter instruction call. A 64-bit filter may operate similar to a 32-bit filter instruction. The radix search method may be the same. The difference may be how the final 64-bit value is obtained. The result may be retrieved as a 64-bit read by double pumping a single memory (e.g., 36-bit wide memory). More than 64 filter rules may also be possible, for example, by filter chaining.

An IP interface, for example, may comprise a number of input filters and a number of output filters. Expansion to a plurality of filters may be allowed through firmware, by grouping and processing filters into sets of filters with common fields at a time.

Key Hashing

A hash key generator may hash a n-bit value down to a m bit value, wherein m<n. One embodiment of a method of key hashing may be fully programmable. The following parameters may be user specified to hash a key: length of key (e.g., in nibbles (4 bits)); polynomial seed value; polynomial coefficients; and polynomial width.

Figure 14:
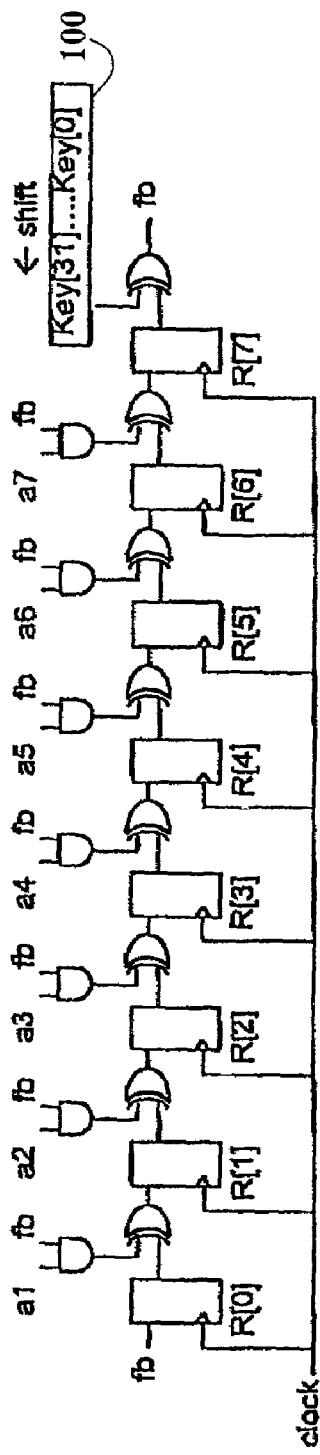
FIG. 14 depicts a functional block diagram of an embodiment of key hashing.

The hash key generator generates a residue (e.g., from 4 to 24-bits wide) based in part on the key, the polynomial coefficients, and the seed. FIG. 14 illustrates one method for key hashing that comprises a bitwise XORing and shifting bits in the key. In one illustrative example, a 32-bit value is hashed down to 8 bits. A general form of the polynomial comprises:

$$X^8 + a7X^7 + a6X^6 + a5X^5 + a4X^4 + a3X^3 + a2X^2 + a1X^1 + X^0$$

If the coefficients are defined as "110010011b," then the polynomial reduces to:

$$X^8 + X^7 + X^4 + a1X^1 + X^0$$

Note that the coefficients of the general form of the polynomial may be specified as 1, a7, a6, a5, a4, a3, a2, a1, 1. The method then hashes down the key to 8 bits. A seed may comprise 8 bits and may be programmed to any value, such as zero. A residue register stores a result after the method processes a bit of the key, and may be initialized (or programmed) to the seed value. In the illustrative example, Residue[7:0]="00000000b" (before processing the bits of the key). After the first bit of the key is processed, the residue comprises:

Residue[0]=fb;

Residue[1]=(fb AND a1) XOR Residue[0]=fb XOR Residue[0];

Residue[2]=(fb AND a2) XOR Residue[1]=Residue[1];

Residue[3]=(fb AND a3) XOR Residue[2]=Residue[2];

Residue[4]=(fb AND a4) XOR Residue[3]=fb XOR Residue[3];

Residue[5]=(fb AND a5) XOR Residue[4]=Residue[4];

Residue[6]=(fb AND a6) XOR Residue[5]=Residue[5]; and

Residue[7]=(fb AND a7) XOR Residue[6]=fb XOR Residue[6], where fb=key[31] XOR Residue[7]

The method is repeated for each bit of the key, continuing with key[30], key[29], . . . , key[0]. After 32 iterations, residue[7:0] comprises the residue of the hashed 32-bit key. Thus, a fully programmable hash key generator may hash a key of unlimited length one key bit at a time (i.e., sequentially).

In another embodiment, key hashing may be performed by chaining hash key generators. For example, a 64-bit value may be hashed down to 8 bits by programming a seed of a second hash key generator to a value of the residue[7:0] of the hashed 32-bit key (see above). Then, after 32 iterations, residue[7:0] of the second hash key generator comprises the residue of the hashed 64-bit key. Thus, a key of unlimited length may be hashed by chaining fully programmable hash key generators.

Figure 15:
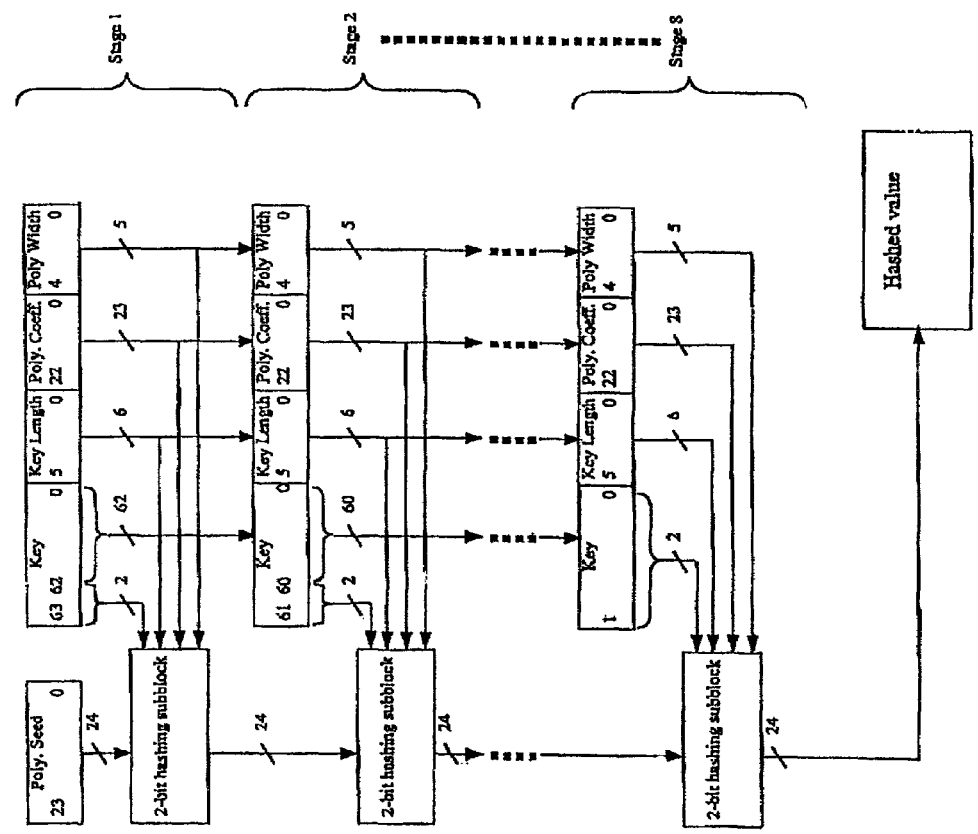
FIG. 15 depicts a functional block diagram of another embodiment of key hashing.

In another embodiment, a programmable hash function (e.g., CRC) using pipeline stages may hash a key. Any length key may be hashed. The polynomial used for the hash function may also be fully programmable: polynomial seed value, polynomial coefficients, and polynomial width (e.g., from 4-24 bits). A method for polynomial calculation may take n bits (e.g., n=2) for each pipeline stage. The pipeline may comprise 8 stages. FIG. 15 illustrates the 8 pipeline stages that hash 2 bits of the key at a time. That is, one pass through the pipeline processes two bytes of the key. The method may cascade back through the pipeline stages when hashing beyond 16-bits, for example. Thus, a 64 bit hash may be looped through the pipeline four times before a result is obtained. When a key is less than two bytes long, for example, the first several stages process the key, depending on a length of the key. The remaining stages then pass the residue along until the final stage is reached. The pipeline stages of the hash key generator improves speed and/or throughput. The larger the value of n, which is the number of bits of the key to hash at a time, the lesser the number of pipeline stages needed to perform the polynomial calculation. For example, if n=4 bits per pipeline stage rather than n=2 bits per pipeline stage, the number of pipeline stages may be decreased in half. The value of n may also be independent for each pipeline stage. In sum, a fully programmable hash key generator may hash a key of unlimited length using pipeline stages.

Monitoring a Network

A network may be monitored using statistics based on network data. Statistics, which aid in monitoring the network, may comprise a packet count and a byte count for a specified statistic in an entry of a memory. This single entry for a specified statistic reduces the overall memory requirements for statistics information.

Figure 16:
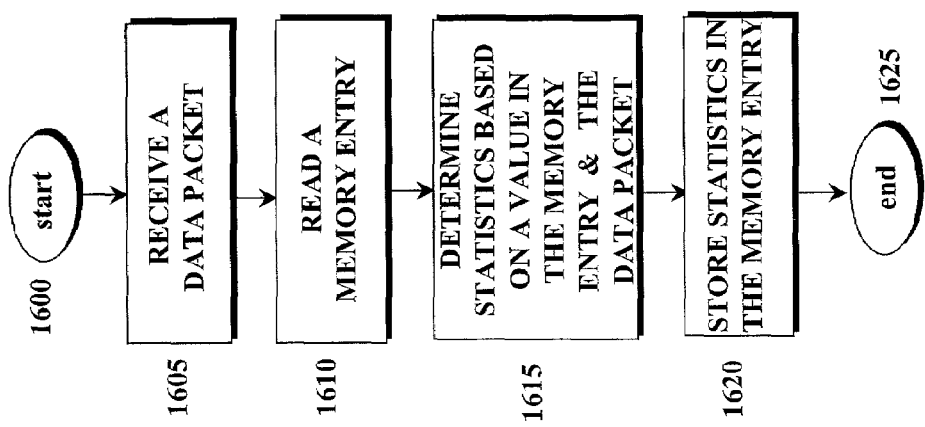
FIG. 16 depicts a flowchart illustrating one operation of an embodiment of monitoring a network.

In one embodiment, a method receives a data packet, as in block 1605 of FIG. 16. In block 1610, the method reads a value in an entry of a memory. In block 1615, the method determines statistical information based on at least one of the value in the entry of the memory and the received data packet. If the method discards the received data packet, then the value in the entry of the memory need not be updated. If the method accepts the received data packet, however, then the value in the entry of the memory may be updated. In block 1620, the method then stores the statistical information in the entry of the memory. The method may determine statistical information by adding an input value to the stored value in the entry of the memory. The method is performed without interruption. That is, the method may perform a write into a memory entry read after the completion of the addition. The addition may be 2's complement with sign preservation (e.g., MSB indicating the sign) and may be "sticky" or "non-sticky." The sticky addition counts to a maximum count and remains there. That is, if an operation is sticky and the value "rolls over" during the addition, the result may be all 1's. If a subtraction causes the result to "roll negative," the result may be all 0's. Subtraction occurs when the given value is negative, in 2's compliment. The non-sticky operation rolls over at maximum count. Alternatively, the method may write any value, such as zero, in the memory entry after reading the stored value.

In one illustrative example, a memory entry containing a set of data bits is read. A first subset of the data bits are incremented, and a second subset of the data bits are added with an input value and the entire set of data bits quantity is returned to the memory entry. The method may comprise 1's complement and at least one of "sticky" and "non-sticky." Statistics add may be stored as is if a positive result is obtained. If a statistics add is sticky, the result may stay at all 1's if the value becomes too large. If the result becomes negative, it may be reset to all 0's regardless if it is sticky or not. This prevents a negative number from being stored.

In another illustrative example, the memory location represents a 64-bit quantity and a value added comprises a 32-bit quantity. The 64-bit result may be positive and added with the 32-bit quantity, which may be in 2's compliment form. Once the addition has been performed, the 64-bit quantity may be written to the memory. The data format for the 64-bit quantity may be as follows:

Data[35:0]—byte count (e.g., positive value) added with the 32 bit 2's compliment value;

Data[63:36]—packet count (e.g., positive value) may be incremented by 1 (or 2, etc.).

If the 32-bit value is negative, meaning bit 31 is high, the 36-bit addition may be performed on the Data[35:0] field. However, the data[63:36] field may be decremented by 1. This subtraction illustration allows to "undo" a statistic add if necessary. If the operation is sticky, the 28 and 36-bit fields may be set to all 1's if the result becomes too large and rolls over. If the result rolls negative, the result may be set to all 0's notwithstanding if the operation is sticky.

An illustrative inbound IP interface may comprise statistics of the following:
  Unicast octets/packets in
  Multicast octets/packets in
  Broadcast octets/packets in
  Total octets/packets in
  Best effort octets/packets
  Clipped octets/packets
  Unicast octets/packets forwarded
  Multicast octets/packets forwarded
  Broadcast octets/packets forwarded
  Total octets/packets forwarded
  Packet TTL under-run
  CIR octets/packets
  CIR BR octets/packets
  BR octets/packets
  Accumulated octets None of the above statistics or any missing statistics, however, are required to be in the memory. The number and frequency of updates may be user specified.

In view of the foregoing, it will be apparent to one of ordinary skill in the art that the described embodiments may be implemented in software, firmware, and hardware. The actual software code or specialized control hardware used to implement the present invention is not limiting of the invention. Thus, the operation and behavior of the embodiments is described without specific reference to the actual software code or specialized hardware components. The absence of such specific references is feasible because it is clearly understood that artisans of ordinary skill would be able to design software and control hardware to implement the embodiments of the present invention based on the description herein.

Moreover, the processes associated with the presented embodiments may be stored in any storage device, such as, for example, non-volatile memory, an optical disk, magnetic tape, or magnetic disk. Furthermore, the processes may be programmed when the system is manufactured or via a computer-readable medium at a later date. Such a computer readable medium may include any of the forms listed above with respect to storage devices.

The foregoing description of the embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit.

As such, the present invention is not intended to be limited to the embodiments shown above but rather is to be accorded the widest scope consistent with the principles and novel features disclosed in any fashion herein.

What is claimed is:

1. A method for monitoring a network comprising:
  receiving at least one data packet from the network;
  reading an entry of a memory device, the entry of the memory device containing both a first statistical value and a second statistical value, wherein the entry is a single memory location of the memory device, wherein the first statistical value includes a packet count, and wherein the second statistical value includes a byte count;
  determining a third statistical value based on at least one of a content of the at least one data packet, the first statistical value, and the second statistical value, wherein the third statistical value includes a new value of the packet count and a new value of the byte count, wherein the determining the third statistical value includes undoing a previous statistic add by adding a negative value to the byte count and decrementing the packet count in response to the adding of the negative value to the byte count;
  storing the entire set of bits of the determined third statistical value into the entry of the memory device;
  wherein said reading, determining and storing are performed without interruption; and
  using the packet count and the byte count to monitor the network.

2. The method of claim 1,
  wherein the at least one data packet contains a set of data bits,
  wherein the first statistical value includes a count of the received at least one data packet, and wherein the second statistical value includes a count of a subset of data bits of the received at least one data packet.

3. The method of claim 1, wherein storing the determined third statistical value in the entry of the memory device overwrites one of the first statistical value and the second statistical value.

4. The method of claim 1, wherein the at least one data packet comprises at least one of SONET, ATM, Ethernet, HDLC, PPP, IP, TCP, and UDP data packet.

5. The method of claim 1, wherein the third statistical value comprises updates to at least one of the first statistical value and the second statistical value.

6. The method of claim 5, wherein the third statistical value updates at least one of the first statistical value and the second statistical value by at least one of incrementing and decrementing the first statistical value and the second statistical value, respectively, by a value.

7. The method of claim 5, wherein the third statistical value updates at least one of the first statistical value and the second statistical value by adding a value to the first statistical value and the second statistical value, respectively.

8. The method of claim 1, wherein the entry of the memory device is associated with the received data packet.

9. The method of claim 2, wherein the subset of data bits of the received data packet comprises 8 data bits of the received data packet.

10. The method of claim 1, further comprising program code for reading said single memory location following said storing, and, in the event that said third statistical value comprises a negative value, writing a predetermined value to said single memory location.

11. The method of claim 10, wherein said predetermined value comprises all zeros.

12. An apparatus for monitoring a network comprising:
a receiver configured to receive at least one data packet from the network;
an entry of a memory device configured to store both a first statistical value and a second statistical value, wherein the entry is a single memory location of the memory device, wherein the first statistical value includes a packet count, and wherein the second statistical value includes a byte count;
a processor coupled to the receiver and the memory device, the processor being configured to read the first statistical value and the second statistical value from the entry, determine a third statistical value based on at least one of a content of the at least one data packet, the first statistical value, and the second statistical value, wherein the third statistical value includes a new value of the packet count and a new value of the byte count, and to store the entire set of bits in the third statistical value into the entry of the memory device, wherein the determining of the third statistical value includes undoing a previous statistic add by adding a negative value to the byte count and decrementing the packet count in response to the adding of the negative value to the byte count, wherein the reading of the first and the second statistical values from the entry, the determining of the third statistical value, and the storing of the third statistical value in the entry are performed without interruption, and wherein the processor is further configured to use the packet count and the byte count to monitor the network.

13. The apparatus of claim 12, wherein the at least one data packet contains a set of data bits, wherein the first statistical value includes a count of the received at least one data packet, and wherein the second statistical value includes a count of a subset of data bits of the received at least one data packet.

14. The apparatus of claim 12, wherein storing the third statistical value in the entry of the memory device overwrites one of the first statistical value and the second statistical value.

15. The apparatus of claim 12, wherein the at least one data packet comprises at least one of SONET, ATM, Ethernet, HDLC, PPP, IP, TCP, and UDP data packet.

16. The apparatus of claim 12, wherein the third statistical value comprises updates to at least one of the first statistical value and the second statistical value.

17. The apparatus of claim 16, wherein the third statistical value updates at least one of the first statistical value and the second statistical value by at least one of incrementing and decrementing the first statistical value and the second statistical value, respectively, by a value.

18. The apparatus of claim 16, wherein the third statistical value updates at least one of the first statistical value and the second statistical value by adding a value to the first statistical value and the second statistical value, respectively.

19. The apparatus of claim 12, wherein the entry of the memory device is associated with the data packet.

20. The apparatus of claim 13, wherein the subset of data bits of the received data packet comprises 8 data bits of the received data packet.

21. The apparatus of claim 12, wherein said processor is further configured to read said single memory location following storing of said third statistical value, and, in the event that said third statistical value comprises a negative value, write a predetermined value to said single memory location.

22. The apparatus of claim 21, wherein said predetermined value comprises all zeros.

23. A computer-readable medium have stored thereon program code for monitoring a network, the program code comprising:
program code for receiving at least one data packet from said network;
program code for reading an entry of a memory device, the entry of the memory device containing both a first statistical value and a second statistical value, wherein the entry is a single memory location of the memory device, wherein the first statistical value includes a packet count, and wherein the second statistical value includes a byte count;
program code for determining a third statistical value based on at least one of a content of the at least one data packet, the first statistical value, and the second statistical value, wherein the third statistical value includes a new value of the packet count and a new value of the byte counts wherein the determining the third statistical value includes undoing a previous statistical add by adding a negative value to the byte count and decrementing the packet count in response to the adding of the negative value to the byte count;
program code for storing the entire set of bits in the determined third statistical value into the entry of the memory device;
wherein the reading, determining and storing are performed without interruption; and using said packet count and said byte count to monitor said network.

24. The computer-readable medium of claim 23, wherein the at least one data packet contains a set of data bits, wherein the first statistical value includes a count of the received at least one data packet, and wherein the second statistical value includes a count of a subset of data bits of the received at least one data packet.

25. The computer-readable medium of claim 23, wherein the program code for storing the determined third statistical value in the entry of the-memory device overwrites one of the first statistical value and the second statistical value.

26. The computer-readable medium of claim 23, wherein the at least one data packet comprises at least one of SONET, ATM, Ethernet, HDLC, PPP, IP, TCP, and UDP data packet.

27. The computer-readable medium of claim 23, wherein the third statistical value comprises updates to at least one of the first statistical value and the second statistical value.

28. The computer-readable medium of claim 27, wherein the third statistical value updates at least one of the first statistical value and the second statistical value by at least one of incrementing and decrementing the first statistical value and the second statistical value, respectively, by a value.

29. The computer-readable medium of claim 27, wherein the third statistical value updates at least one of the first statistical value and the second statistical value by adding a value to the first statistical value and the second statistical value, respectively.

30. The computer-readable medium of claim 23, wherein the entry of the memory device is associated with the received data packet.

31. The computer-readable medium of claim 24, wherein the subset of data bits of the received data packet comprises 8 data bits of the received data packet.

32. The computer-readable medium of claim 23, wherein said program code further comprises:

program code for reading said single memory location following said storing, and, in the event that said third statistical value comprises a negative value, writing a predetermined value to said single memory location.

33. The computer-readable medium of claim 32, wherein said predetermined value comprises all zeros.

* * * * *